United States Patent [19]

Hönlinger et al.

[11] Patent Number: 5,558,592
[45] Date of Patent: Sep. 24, 1996

[54] ACCESSORY DRIVE

[75] Inventors: Herwig Hönlinger, Gross-Rohrheim; Hans-Gerd Eckel, Laudenbach; Jürgen Eichhorn, Weinheim, all of Germany

[73] Assignee: Firma Carl Freudenberg, Germany

[21] Appl. No.: 342,288

[22] Filed: Nov. 18, 1994

[30] Foreign Application Priority Data

Nov. 18, 1993 [DE] Germany ............... 43 39 218.0

[51] Int. Cl.$^6$ ............... F16H 3/56; F16H 57/10
[52] U.S. Cl. ............... 475/285; 475/312; 475/324; 475/339; 464/83; 464/89; 464/180
[58] Field of Search ............... 475/284, 285, 475/311, 312, 323, 324, 338, 339; 464/61, 82, 83, 87, 89, 180, 147

[56] References Cited

U.S. PATENT DOCUMENTS

| | | | |
|---|---|---|---|
| 3,354,670 | 11/1967 | Fawick | 464/61 |
| 3,438,222 | 4/1969 | Paulsen | 464/83 X |
| 3,906,745 | 9/1975 | Faust | 464/61 X |
| 4,249,396 | 2/1981 | Ziegler | 464/83 |
| 4,764,152 | 8/1988 | Jörg et al. | 464/89 |
| 4,772,245 | 9/1988 | Readman et al. | 464/89 |
| 4,825,718 | 2/1989 | Seifert et al. | 464/89 X |
| 4,878,401 | 11/1989 | Chung | 475/312 X |
| 4,961,254 | 10/1990 | Andra et al. | 464/89 X |
| 5,011,464 | 4/1991 | White | 475/324 X |
| 5,123,884 | 6/1992 | Kondoh et al. | 464/89 X |

FOREIGN PATENT DOCUMENTS

| | | | |
|---|---|---|---|
| 203913 | 6/1959 | Austria | 475/311 |
| 3427171 | 1/1986 | Germany | 464/61 |
| 57-171161 | 10/1982 | Japan | 475/339 |

*Primary Examiner*—Charles A. Marmor
*Assistant Examiner*—Nathan O. Jensen
*Attorney, Agent, or Firm*—Kenyon & Kenyon

[57] ABSTRACT

An accessory drive for attachment to the end of a shaft. The drive comprises a belt pulley, a carrier with at least a first and a second planet wheel that are strongly coupled and which have differing numbers of teeth, the first planet wheel being in engagement with a first gear circulating along with the shaft, and the second planet wheel with a second gear that is rotatable relative to the shaft, an activatable and deactivatable brake being provided between a continuously stationary part and a part capable of relative rotation, and a freewheel to prevent backward relative rotation of the second gear with respect to the end of the shaft. The first and second gears are arranged radially inside the carrier, such that the freewheel is arranged between the carrier and the part capable of relative rotation and the belt pulley at least partially surrounds the freewheel, the carrier, and the brake radially and externally, and so that the belt pulley and carrier are joined in rotary engagement.

11 Claims, 1 Drawing Sheet

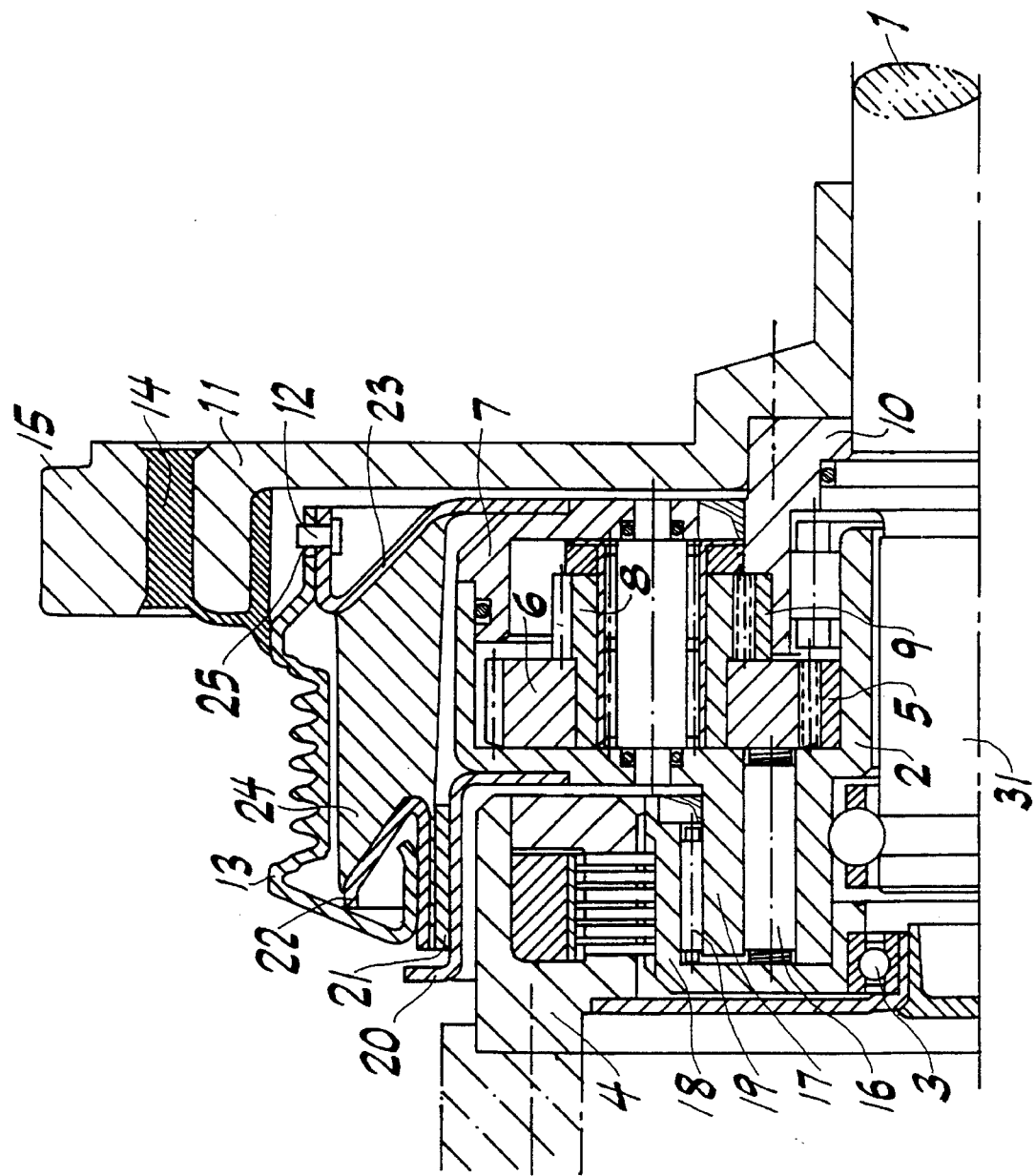

ACCESSORY DRIVE

BACKGROUND OF THE INVENTION

The present invention relates generally to an accessory drive for the end of a shaft, said accessory drive being of the type comprising a belt pulley, a carrier, and at least a first and a second planet wheel that are strongly coupled togehter and which have differing numbers of teeth (i.e., differing gear radii). In such a device, the first planet wheel is in engagement with a first gear circulating along with the shaft, and the second planet wheel with a second gear that is rotatable relative to the shaft. A selectively actuable brake is provided between a fixed, stationary part and a part capable of relative rotation. A freewheel prevents backward relative rotation of the second gear with respect to the shaft end, with the first and second gears are arranged radially inside the carrier.

An accessory drive of this kind is known from EP-A 0 301 704, which corresponds to U.S. Pat. No. 4,862,770 (the contents of which are incorporated herein by reference). When the brake is released, the entire torque of the shaft end is transferred through the freewheel, which can lead to severe wear and a diminution in service life. In addition, the belt pulley precedes the planet wheel and the brake in the axial direction. This undesirably results in a large overall axial length.

There remains a need to further develop an accessory drive mechanism of this general type such that it is both substantially more robust and has a reduced overall length in the axial direction.

SUMMARY OF THE INVENTION

The present invention meets this need by further developing an accessory drive for attachment to the end of a shaft. The accessory drive comprises a belt pulley, a carrier joined in rotary engagement with the belt pulley, and first and second planet wheel in association with the carrier. The planet wheels are rigidly connected to one another and have dissimilar diameters. A first gear circulates along with the shaft, and engages the first planet wheel. A second gear, rotatable relative to the shaft, engages the second planet wheel. A selectivley activatable brake is located between a permanently stationary part and a part capable of relative rotation.

A freewheel is arranged between the carrier and a part that is capable of relative rotation. The part capable of relative rotation and the second gear are nonrotatably joined to each other. The belt pulley at least partially surrounds the freewheel, the carrier, and the brake radially and externally. The belt pulley and carrier are joined in a rotary engagement. When the brake is released, the torque is divided and transferred from the shaft end to the carrier and thus the belt pulley. A great deal of stress is removed from the freewheel, which extends the latter's working life.

The belt pulley at least partially surrounds the main components of the accessory drive in the radial direction. As a result, the accessory drive has a substantially shorter overall length as compared with the embodiment according to the prior art.

The carrier and the belt pulley can be joined by a torsion spring, which makes it possible to isolate torsional vibrations that occur during use.

The torsion spring may advantageously be made of an elastomeric material that joins axially adjacent surfaces of the belt pulley and the carrier. This embodiment allows particularly good isolation of torsional vibrations. To prevent a radially oriented deflection movement of the belt pulley as a result of the belt forces being absorbed, it is advantageous to support the belt pulley on the carrier in a manner allowing relative rotation, for example using an interposed plain or rolling bearing. In an embodiment of this kind, the belt pulley can surround the torsion spring externally at a small radial spacing. Deformations of the torsion spring due to centrifugal force can be limited in this manner to an allowable maximum.

The relative rotatability of the belt pulley with respect to the carrier can be limited by at least one stop of one part capable of being brought into engagement with at least one counterstop on the other part. This configuration also serves ultimately to help provide a particularly long service life. In this embodiment the stop and counterstop can be surrounded radially and externally by a protective sleeve joined rigidly to the shaft end, which helps reduce hazards due to accidents. It is additionally possible to fasten an inertial ring to the protective sleeve, in a manner allowing relative rotation, by means of a rubber spring, and to use this ring to reduce torsional vibrations of the shaft end.

BRIEF DESCRIPTION OF THE DRAWING

The FIGURE provides a half-sectional view of an embodiment of an accessory drive constructed according to the principles of the invention.

DETAILED DESCRIPTION

The accessory drive illustrated is intended to be concentrically mounted to the end of a shaft. A threaded bolt 31 passing concentrically through the accessory drive provides this attachment.

A sleeve 2 is mounted onto the threaded bolt 31 via radial ball bearing means that permit the sleeve to rotate with respect to the bolt. The sleeve is nonrotatably joined in the center part of its axial extent to a second gear 5, which is in continuous engagement with a second planet wheel 6 of a carrier 7. First planet wheel 8 of carrier 7 is nonrotatably joined to second planet wheel 6. First planet wheel 6 is in continuous engagement with first gear 9, which is nonrotatably joined via an attachment ring 10 to a shaft end 1 and to a sleeve 11. The sleeve 11 radially and externally surrounds stops and counterstops 12 of carrier 7 and belt pulley 13. Sleeve 11 is surrounded radially and externally by a rubber layer 14 and by an inertial ring 15 which acts to reduce torsional vibrations of shaft end 1. Rubber layer 14 contacts but is not attached to bent pulley 13.

In the left-hand part of the FIGURE, the sleeve 2 is radially surrounded by an annular projection 17 of the carrier 7. A freewheel 16 is arranged in the gap between the sleeve 2 and the annular projection 17 to prevent backward relative rotation of the carrier 7 with respect to the sleeve 2. A brake 4 is supported on its nonrotating portion, in a manner allowing relative rotation, on the left end of sleeve 2 by means of a radial ball bearing 3. In addition, the nonrotating portion of the brake is joined by means of a holder (not shown) to a fixed support. The realativery rotateable part 18 of break 4 is connected to sleeve 2.

Carrier 7 is mounted with its annular projection 17 on the relatively rotatable part 18 of the brake 4 by means of a needle roller bearing 19.

Carrier 7 is joined, in a manner not allowing relative rotation, to a support collar 20 that is surrounded externally by a sliding bearing 21 and that provides radial support, in a manner allowing relative rotation, for the belt pulley 13. Plain bearing 21 can, if necessary, be replaced by a needle roller bearing or radial ball bearing.

In the right-hand part of the FIGURE, carrier 7 bears a flange 23 projecting radially outward, and in the left-hand part of the depiction belt pulley 13 bears a flange 22 projecting radially inward. The two flanges 22, 23 are joined by a torsion spring 24 in a manner allowing relative rotation therebetween. At the right end of belt pulley 13 is at least one stop 12 which, when the accessory drive is not rotating, is at a circumferential distance from a stop or counterstop 25 of flange 23. If, during use, rotational forces are introduced via belt pulley 13 into torsion spring 24 and exceed its load capacity, mutual contact between the stop and the counterstop will occur, with the result that the rotational forces are transferred directly to carrier 7 and are kept away from torsion spring 24. A reversal of the force transfer direction does not lead to any change in operation. All that is necessary is to reverse the stop and counterstop in terms of their mutual arrangement. Embodiments in which the stop is preceded at a distance by counterstops in both circumferential directions are also possible. Such stops and counterstops can be used to transfer forces in both circumferential directions.

To explain the general operation of the device, reference will be made to an embodiment such as has been described above, in which the accessory drive is mounted on the crankshaft of an internal combustion engine and is used, for example, to drive a generator. In the context of this application, the rotation speed of the crankshaft is to be doubled at low shaft speeds in order to raise the output of the generator. To this end, brake 4 of the accessory drive is actuated, which places the second gear 5 in a stationary position. Consequently, the rotary motion transferred from the crankshaft end to the first gear 9 results in a rolling-contact motion of the first planet wheel 8, which is rigidly coupled to second planet wheel 6 and which has half the number of teeth (i.e., half the diameter) of the second planet wheel 6. The two planet wheels 8 and 6 are thus caused to rotate together, as a result of which carrier 7 circles the crankshaft end at an increased speed. This high speed is transferred to belt pulley 13 and from it to the associated generator.

At a high crankshaft speed, a corresponding increase in rotational speeds is not necessary. In this case brake 4 is released, with the result that the rotation speed of the crankshaft end is transferred unchanged, via freewheel 16, to carrier 7, and through it to belt pulley 13. The rotation speed of belt pulley is consequently identical to that of the crankshaft end.

A division occurs in this case with regard to power flow, since the rotational forces are transferred on the one hand via the freewheel and on the other hand via the axis of the coupled planet wheels 6 and 8 to carrier 7. As a result, freewheel 16 experiences relatively less stress, which improves its durability.

What is claimed is:

1. An accessory drive for attachment to the end of a shaft, comprising:
    a belt pulley;
    a torsion spring;
    a carrier that is joined in rotary engagement with the belt pulley via the torsion spring;
    at least a first and second planet wheel in association with the carrier, said first and second planet wheels being rigidly connected to one another and being of dissimilar diameter;
    a first gear circulating along with the shaft, wherein the first planet wheel is in engagement with the first gear;
    a second gear that is rotatable relative to the shaft, wherein the second planet wheel is in engagement with the second gear, wherein said first and second gears are arranged radially inside the carrier;
    a selectively activatable brake located between a permanently stationary part and a part capable of relative rotation; and
    a freewheel to prevent backward relative rotation of the carrier with respect to the sleeve;
    wherein the freewheel is arranged between the carrier and the part capable of relative rotation, and the belt pulley at least partially surrounds the freewheel, the carrier, and the brake radially and externally.

2. An accessory drive as set forth in claim 1, wherein the torsion spring is made of an elastomeric material and joins axially adjacent surfaces of the belt pulley and the carrier.

3. An accessory drive as set forth in claim 2, wherein the belt pulley externally surrounds the torsion spring with a small radial spacing.

4. An accessory drive as set forth in claim 2, wherein the belt pulley is supported on the carrier in a manner allowing relative rotation.

5. An accessory drive set forth in claim 4, wherein the relative rotatability of the belt pulley with respect to the carrier is limited by at least one stop on one of these two parts, which can be brought into engagement with at least one counterstop on the other of the two parts.

6. An accessory drive as set forth in claim 4, wherein the belt pulley externally surrounds the torsion spring with a small radial spacing.

7. An accessory drive set forth in claim 2, wherein the relative rotatability of the belt pulley with respect to the carrier is limited by at least one stop on one of these two parts, which can be brought into engagement with at least one counterstop on the other of the two parts.

8. An accessory drive set forth in claim 7, wherein the stop and counterstop are surrounded radially and externally by a protective sleeve joined rigidly to the shaft end.

9. An accessory drive as set forth in claim 1, wherein the relative rotatability of the belt pulley with respect to the carrier is limited by at least one stop on one of these two parts, which can be brought into engagement with at least one counterstop on the other of the two parts.

10. An accessory drive set forth in claim 9, wherein the stop and counterstop are surrounded radially and externally by a protective sleeve joined rigidly to the shaft end.

11. An accessory drive set forth in claim 10, wherein an inertial ring is fastened to the protective sleeve, in a manner allowing relative rotation, by means of a rubber spring.

* * * * *